July 25, 1950     F. C. HALL     2,516,463
SPRING-TOOTH HARROW
Filed Nov. 20, 1946     2 Sheets-Sheet 1
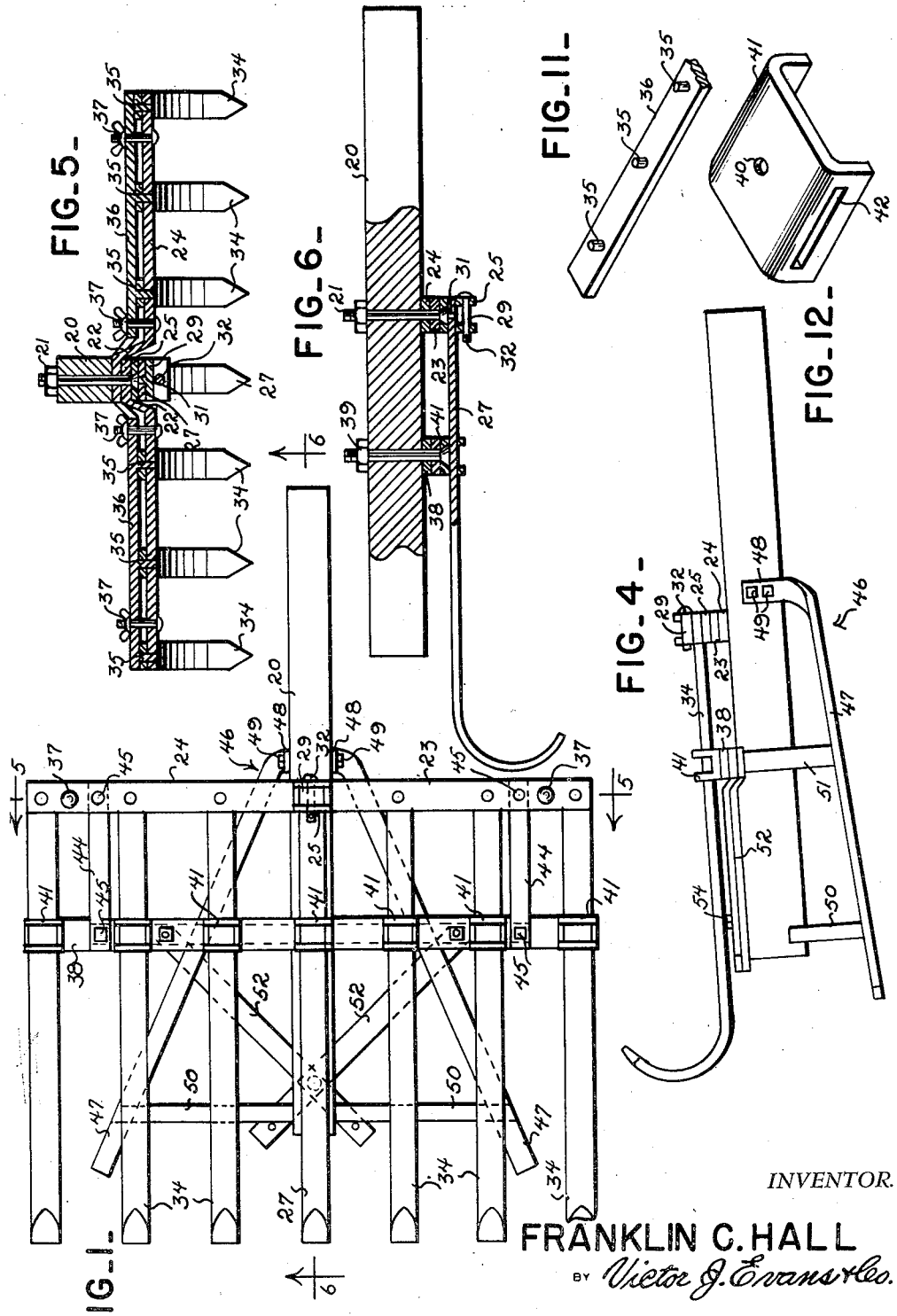
INVENTOR.
FRANKLIN C. HALL
BY *Victor J. Evans & Co.*
ATTORNEYS

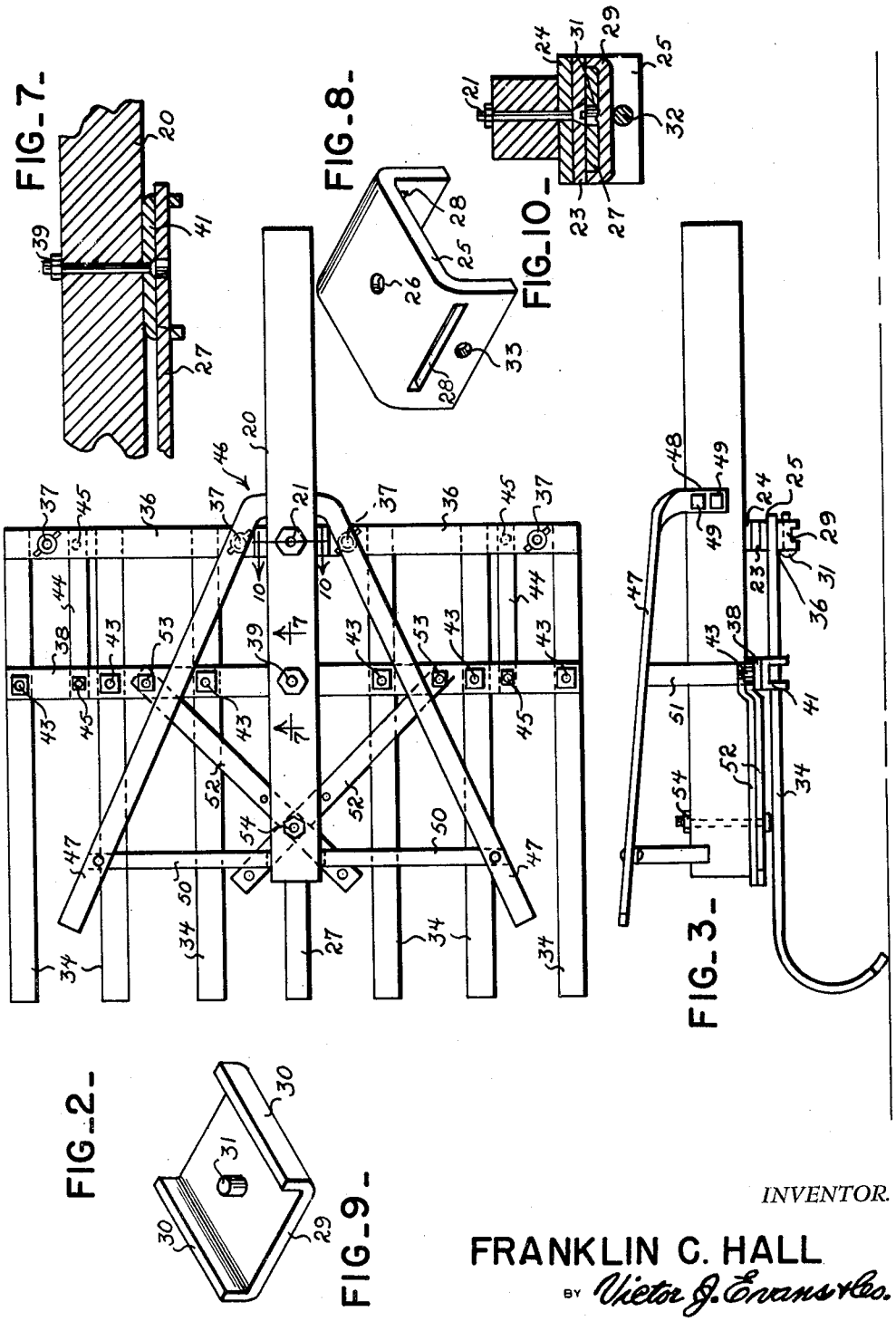

Patented July 25, 1950

2,516,463

UNITED STATES PATENT OFFICE 2,516,463

SPRING-TOOTH HARROW

Franklin C. Hall, Crossville, Ala.

Application November 20, 1946, Serial No. 711,116

4 Claims. (Cl. 55—33)

This invention relates to improvements in harrows or earth scratchers, and the general object of the invention is to provide means for detachably and adjustably connecting the teeth of the implement to the frame thereof, so that the teeth may be adjusted or removed and replaced.

Another object of the invention is to provide a device that is simple and efficient in operation, and will save time and labor in the adjusting and receiving and replacing of the spring teeth embodied in the device.

With the above and other objects and advantages in view, the invention consists of the novel details of construction, arrangement and combination of parts more fully hereinafter described, claimed and illustrated in the accompanying drawings in which:

Figure 1 is a bottom plan view of an embodiment of the invention;

Figure 2 is a top plan view thereof;

Figure 3 is a side view of Figure 2;

Figure 4 is a side view of Figure 1;

Figure 5 is a sectional view on the line 5—5 of Figure 1;

Figure 6 is a detailed sectional view of the mounting for the center tooth on line 6—6 of Figure 1;

Figure 7 is a detailed sectional view of the cuff coupling on line 7—7 of Figure 2;

Figure 8 is a perspective view of the front upper cuff;

Figure 9 is a perspective view of the bottom plate of the cuff coupling assembly;

Figure 10 is a detailed sectional view showing the cuff coupling in Figures 8 to 9 in use on line 9—9 of Figure 2;

Figure 11 is a perspective view of one of the coupling plates and

Figure 12 is a perspective view of a rear cuff coupling.

Referring more in detail to the drawings, the reference numeral 20 designates the beam to which are secured by means of a bolt 21, the angled ends 22 of the cross bars 23 and 24 respectively, the bolt 21 also securing the cuff 25 to the beam under bar 23 by means of the central opening 26 therein. The center scratcher tooth 27 is mounted in the elongated slots 28 on opposite sides of the cuff 25, and then the bottom plate 29 having the flanges 30 thereon and the central stud 31 is placed on the bottom of the tooth 27, and the stud passes through an opening therein, and a bolt 32 passes through the openings 33 in the cuff 25 below the slots 28 and tooth 27, and the stud passes through an opening therein and a bolt 32 passes through the openings 33 in the cuff 25 below the slots 28 and tooth 27 to retain this end of the tooth in fixed relation to the beam 20.

The teeth 34 outwardly of the tooth 27, are also apertured adjacent their ends in the same manner as tooth 27, and relatively spaced studs 35 on the plates 36 pass through the openings in the teeth, and the openings in the cross bars 23 and 24, and winged nuts 37 pass through the cross bars 23 and 24 and plates 36 retain these ends of the teeth 34 in fixed relation to the crossbars 23 and 24.

A third cross bar 38 is secured to the beam 20 rearwardly of, in parallel relation to cross bars 23 and 24 by a bolt 39 passing through the central hole 40 of the cuff 41, and the tooth 27 passes through the elongated slot 42 in the cuff to retain tooth 27 in fixed relation to the beam 20.

The bar 38 is provided with openings in alinement with the teeth 34, and each opening receives a bolt 43 which secures a cuff 41 thereto, so that the teeth 34 pass through the elongated openings 42 in the cuff 41, as does the tooth 27. Plates 44 secured to the cross bars 23 and 24 and 38 by bolts 45 retain the cross bars in fixed parallel relation to each other.

Thus assembled, the teeth 34 may be removed by loosening wing nuts 37 and removing bars 36, and tooth 27 may be removed by receiving pin 32. Thus the teeth may be quickly removed and replaced as desired.

The teeth will be considered as being on the bottom of the beam, and secured to the top of the beam is the sliding frame 46 whereby the scratcher may be moved from one location to the other without scratching the earth during the movement thereof. This frame comprises the outwardly extending sides 47 having depending fasteners 48 which are secured to opposite sides of the beam 20 in alinement with each other by bolts 49, and angle braces 50 and 51 respectively are secured to the sides 47, and beam 20, for the strengthening thereof, angle beams 52 being secured to the cross bar 38 by bolts 53 and to the beam 20 by a bolt 54 for the strengthening of the entire unit.

There has thus been provided, a scratcher having teeth mounted in a unique manner thereon so that the teeth may be quickly removed and replaced as desired, and it is believed that from the foregoing description, the structure and operation of the invention will be apparent to those skilled in the art.

It is also to be understood that changes in the minor details of construction, arrangement and combination of parts may be resorted to, provided they fall within the spirit of the invention and the scope of the appended claims.

Having thus described the invention, what is claimed as new and desired to be secured by Letters Patent is:

1. A device of the character described, comprising a center beam, oppositely horizontally extending superposed upper and lower cross bars, apertured angularly inclined ends on the inner ends of said bars, means passing through said beam and said apertured ends for detachably securing said ends to said beam, a center tooth positioned below said beam in parallel relation thereto, said last means adapted to detachably secure said center tooth to said beam below and within the angled ends of said bars and means for detachably securing outer teeth to said cross bars, a third cross bar secured to said beam rearwardly of said first mentioned cross bars and means for detachably securing the teeth to said last mentioned cross bar whereby the teeth are retained in fixed parallel relation to each other, and to said cross bar.

2. The invention as in claim 1 wherein the means for detachably securing the outer teeth to said first mentioned cross bars comprises relatively spaced studs on said upper bar which are adapted to engage in openings in said teeth, and bolts for securing said upper cross bars to said lower cross bar.

3. The invention as in claim 1, wherein the means for securing said teeth to said last mentioned cross bar comprises cuffs having elongated slots therein through which said teeth pass.

4. The invention as in claim 1 wherein means is provided on said beam to aid in transporting said device from one location to another.

FRANKLIN C. HALL.

REFERENCES CITED

The following references are of record in the file of this patent:

UNITED STATES PATENTS

| Number | Name | Date |
|---|---|---|
| 813,377 | Guice | Feb. 20, 1906 |
| 820,601 | Robinson | May 15, 1906 |
| 1,066,481 | Forkner | July 8, 1913 |
| 1,091,712 | Soward | Mar. 31, 1914 |
| 1,749,074 | Hill | Mar. 4, 1930 |
| 2,092,679 | Nix | Sept. 7, 1937 |
| 2,100,499 | Whitehead | Nov. 30, 1937 |